(12) United States Patent
Chang et al.

(10) Patent No.: US 6,722,002 B1
(45) Date of Patent: Apr. 20, 2004

(54) METHOD OF PRODUCING TI BRAZING STRIPS OR FOILS

(75) Inventors: Chen-Chung S. Chang, Attleboro, MA (US); Bijendra Jha, North Attleboro, MA (US)

(73) Assignee: Engineered Materials Solutions, Inc., Attleboro, MA (US)

( * ) Notice: Subject to any disclaimer, the term of this patent is extended or adjusted under 35 U.S.C. 154(b) by 0 days.

(21) Appl. No.: 10/320,068

(22) Filed: Dec. 16, 2002

Related U.S. Application Data
(60) Provisional application No. 60/340,508, filed on Dec. 14, 2001.

(51) Int. Cl.$^7$ ............................ B21B 1/22; B21B 3/00; B21D 33/00; B23P 17/04; B32B 31/00
(52) U.S. Cl. ................... 29/17.2; 29/17.3; 148/432; 148/426; 148/421; 228/117; 228/158; 228/235.2; 228/235.3
(58) Field of Search .................. 29/17.1, 17.2, 29/17.3, 17.4, 17.6; 148/432, 426, 421; 228/3.1, 115, 116, 117, 158, 235.2, 235.1, 235.3

(56) References Cited

U.S. PATENT DOCUMENTS

| | | | |
|---|---|---|---|
| 2,753,623 A | * 7/1956 | Boessenkool et al. | 228/205 |
| 3,854,194 A | 12/1974 | Woodard | 29/494 |
| 3,981,429 A | 9/1976 | Parker | 228/194 |
| 4,009,027 A | 2/1977 | Naidich et al. | 75/154 |
| 4,026,677 A | 5/1977 | Galasso et al. | 428/649 |
| 4,029,479 A | 6/1977 | Parker | 428/660 |
| 4,034,454 A | 7/1977 | Galasso et al. | 428/576 |
| 4,448,605 A | 5/1984 | Mizuhara | 75/123 H |
| 4,448,853 A | 5/1984 | Fischer et al. | 428/607 |
| 4,586,964 A | 5/1986 | Finnegan et al. | 148/11.5 A |
| 4,606,981 A | 8/1986 | Mizuhara | 428/606 |
| 4,612,259 A | 9/1986 | Ueda | 428/661 |
| 4,706,872 A | 11/1987 | Norris | 228/194 |
| 4,725,509 A | 2/1988 | Ryan | 428/607 |
| 4,780,374 A | 10/1988 | Mizuhara | 428/660 |
| 4,871,622 A | 10/1989 | Rabinkin | 428/576 |
| 5,028,495 A | 7/1991 | Hirano et al. | 428/622 |
| 5,082,161 A | 1/1992 | Utida et al. | 228/122 |
| 5,222,282 A | 6/1993 | Sukonnik et al. | 29/17.9 |
| 5,489,411 A | 2/1996 | Jha et al. | 419/3 |
| 5,553,770 A | * 9/1996 | Jha et al. | 228/190 |
| 5,686,190 A | * 11/1997 | Mennucci et al. | 428/472 |
| 5,761,799 A | * 6/1998 | Mennucci | 29/825 |
| 6,022,426 A | * 2/2000 | Mennucci et al. | 148/527 |
| 6,143,241 A | 11/2000 | Hajaligol et al. | 419/31 |
| 6,294,130 B1 | 9/2001 | Hajaligol et al. | 419/31 |

* cited by examiner

*Primary Examiner*—Michael La Villa
(74) *Attorney, Agent, or Firm*—Pearne & Gordon LLP

(57) ABSTRACT

A method for producing titanium alloy brazing strips and the resulting brazing strips and/or foils. The method uses a cold-rolling process without annealing to generate a titanium based multi-layer alloy strip or foil made up of discrete layers of titanium and an additional layer or layers of one or more metals, such as nickel and/or copper, for example, or alloys thereof, with the layer of titanium roll bonded without annealing to the layers of the additional metal(s). The resulting strip or foil can include, for example, Cu/Ti/Cu, Ni/Ti/Ni, and Ni/Ti/Cu, and also, for example, Cu/Ni/Ti/Ni/Cu, and Ni/Cu/Ti/Cu/Ni, among other combinations. The resulting strip or foil can be used for brazing, creating an alloy of the weight percentage of the original materials.

22 Claims, 2 Drawing Sheets

METHOD OF PRODUCING TI BRAZING STRIPS OR FOILS

This application claims the benefit of U.S. Provisional Patent Application No. 60/340,508 filed Dec. 14, 2001.

BACKGROUND OF THE INVENTION

The present invention relates generally to a method for producing titanium alloy brazing strips and the resulting brazing strips or foil. More particularly, the invention relates to a method for using a cold-rolling process to generate a titanium based multi-layer alloy strip or foil made up of discrete layers of titanium and an additional metal or metals, such as nickel and/or copper, for example.

Brazing alloys based on titanium (Ti) are useful for brazing components that consist of titanium, nickel (Ni) and/or iron/steel (Fe) based elements or alloys, among other uses. Thin gauge brazing strips or foils have proven useful for filling braze joints, and/or for providing suitable substrate materials to form self-brazing bonds and/or for vacuum brazing. The lower melting points of common Ti-based brazing alloys cause a beneficial minimum effect on the microstructures and mechanical properties of the brazed components. Furthermore, Ti-based brazing alloys tend to provide corrosion resistance that is superior to conventional copper (Cu) or silver (Ag) based brazing alloys. A roll bonding process is useful for allowing desirable brazing alloys to be produced in continuous coil form in thin gauge. The availability of these Ti-based brazing alloys in thin foil gauge and in continuous coil lengths has been difficult to achieve as these alloys tend to be brittle and render the conventional cold working process difficult to utilize. Cold rolling titanium typically results in a brittle metal. Thus, a means for obtaining Ti based brazing alloys and/or compounds and/or laminates in a foil form using conventional cold working techniques would be useful.

In the arrangement of the components of a multi-layered brazing alloy, it would often be useful to have the Ti layer in the middle. The advantages of having the Ti layer in the middle would be the resulting uniform relative thickness of the Cu/Ni to Ti as well as the homogenous deformation of the composite during the cold reduction. These advantages are often important to provide uniform chemistry and thin finish thickness for brazing shim application.

This is in contrast to the Ti/Cu—Ni/Ti arrangement cited in the U.S. Pat. No. 3,652,237 (incorporated herein by reference). In that patent, the Ti layers are on the outside of the relatively soft Ni—Cu layer. The Ti layers are hermetically welded to form an envelope to sandwich the Ni—Cu layer. A few drawbacks can result from this arrangement. The exposed, reactive Ti layers may not permit the annealing of the composites, because it is conducted in air or hydrogen or nitrogen as Ti reacts and forms easily Ti oxide, hydride and nitride with the respective heat treating atmospheres. This leaves the annealing typically only feasible in a vacuum, which is typically not a process that can be performed in a continuous, strip-annealing manner. The hard Ti layers on top of the soft Ni—Cu layers can also introduce non-uniform deformation of the softer layers. The non-uniform deformation of a center soft layer can affect the local alloy chemistry by deviating from the intended composition required by the brazing. This type of localized, non-uniform deformation of the center layer can also post a limit on the minimum thickness that strip can reach before the local asperity leads to a fracture of the materials.

It would be useful to have a strongly adherent, multi-layered composite produced by a roll bonding process avoiding some or all of the above problems. The roll bonding process has a few advantages over the other approaches such as plating or hot bonding. It would be advantageous to utilize a roll bonding process to provide a large reduction (such as greater than 60%, for example) during the bonding of the components in the brazing alloy. The large reduction, by breaking up the surface scale, would allow a true metallurgical bond to form between the dissimilar materials. Because the temperature of roll bonding process can be advantageously low, there is little concern of possible alloy diffusion or scale formation, especially if annealing steps can be avoided. The bond integrity could allow the composite to be processed to the desirable thickness, preferably without any intermediate annealing to soften the materials. However, using a Cu—Ni alloy, especially in a near-equal weight percent condition, typically results in significant hardening if utilized in a cold rolling process, and thus requires intermediate annealing steps to get to a sufficiently thin gage. A process that does not require the annealing step could provide savings in time and money.

Furthermore, intermediate annealing is often not desirable because brittle compounds between the constituent might form and render any further cold reduction difficult or even impossible. One advantage of a roll bonding process is to allow the strips to be bonded at heavy thickness, followed by the conventional cold reduction process, and thus providing a higher throughput than another process such as plating. Furthermore, the roll bonding process allows the adjustment of the relative thickness of individual constituents in order to tailor the chemical composition of brazing alloys. In addition, eliminating any annealing processes simplifies the manufacturing process and reduces energy costs. Consequently, providing a means for using a cold rolling process to generate the desired Ti alloy thin sheets and foils would be beneficial.

SUMMARY OF THE INVENTION

Provided is a brazing strip or foil comprising a first metallic layer, a second metallic layer, and a titanium layer including one of titanium and a titanium alloy. The titanium layer is placed between the first and the second metallic layers, wherein said titanium layer is roll bonded without annealing to at least one of said first and said second metallic layers.

Also provided is a brazing strip or foil comprising a first layer including one of copper, a copper alloy, nickel, and a nickel alloy; a second layer including one of copper, a copper alloy, nickel, and a nickel alloy; and a titanium layer including one of titanium and a titanium alloy. The titanium strip is placed between the first and the second metallic layers, wherein said titanium layer is roll bonded without annealing to at least one of said first and said second layers.

Further provided is a brazing strip or foil comprising a first metallic layer; a second metallic layer; a third metallic layer; a fourth metallic layer, and a titanium layer including one of titanium and a titanium alloy.

The first and the second layers are layered on one side of the titanium layer, while the third and the fourth layers layered on another side of the titanium layer.

Still further provided is a brazing strip or foil comprising a first layer including one of copper and a copper alloy; a second layer including one of nickel and a nickel alloy; a third layer including one of nickel and a nickel alloy; a fourth layer including one of copper and a copper alloy; and a titanium layer of one of elemental titanium and a titanium alloy.

The first and the second layers are layered on one side of the titanium layer, while the third and the fourth layers are layered on another side of the titanium layer, wherein said titanium layer is metallurgically bonded to at least one of said first, said second, said third, and said fourth layers.

Also provided is a brazing strip or foil comprising a titanium core of one of titanium and a titanium alloy and at least one covering layer of one of copper, a copper alloy, nickel, and a nickel alloy, with said covering layer substantially covering said titanium core, wherein said covering layer is roll bonded without annealing to said titanium core.

Additionally provided is a method of making a brazing strip or foil comprising the steps of providing a first strip including one of copper, a copper alloy, nickel, and a nickel alloy; providing a second strip including one of copper, a copper alloy, nickel, and a nickel alloy; providing a titanium strip including one of titanium and a titanium alloy; and processing the titanium strip between the first and the second strips with a rolling machine into a desired thickness, thereby resulting in a roll bonded, multi-layered brazing strip or foil.

And further provided is a method of making a brazing strip or foil comprising the steps of providing a first strip including one of copper and a copper alloy; providing a second strip including one of nickel and a nickel alloy; roll bonding the first strip to the second strip to substantially bond the first strip to the second strip and to form a reduced thickness outer composite strip The process also involves the step of providing a titanium strip including one of titanium and a titanium alloy; and processing the titanium strip with a layer of the outer composite strip on each side of the titanium strip, the processing performed with a rolling machine to substantially bond the layers of the outer composite strip to the titanium strip and to process the resulting brazing strip or foil into a desired thickness, thereby further resulting in a thin, metallurgically bonded, multi-layered brazing strip or foil.

DETAILED DESCRIPTION OF THE PREFERRED EMBODIMENTS

Figure 1:
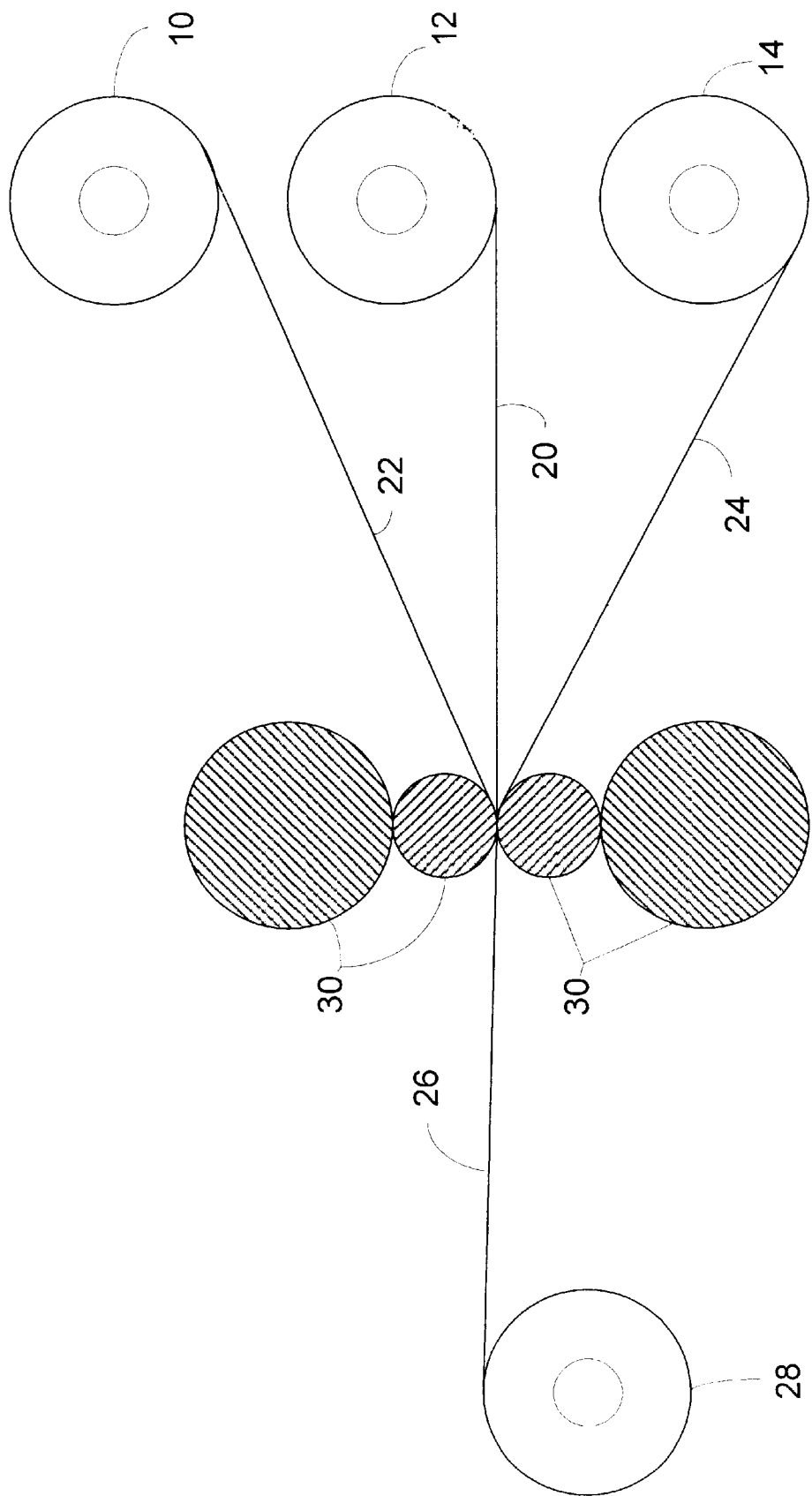
FIG. 1 is a block diagram showing a bonding mill, such as might be utilized to process the brazing strip.

To summarize the invention, commercially pure, or nearly pure, Ti, Cu, and/or Ni strips, with the proper thickness, are roll bonded together by a process to form multi-layer composite strips and/or foils useful in brazing. The thickness of each component is selected so that the weight percent of each component matches that of the desired composition of the brazing alloy.

The process involves taking an individual strip, or multiple strips, of titanium (Ti), with a strip, or multiple strips, comprised of elemental copper (Cu) and/or nickel (Ni), alloys thereof, or combinations thereof, placed on one, or both, sides of the Ti strip. Optionally, one or more multi-layered, bonded or unbonded (individual), Cu/Ni strip(s), or alloys thereof, may be placed next to the Ti strip, when multiple layers of those metals are desired. The thus-placed strips are then processed, such as being cold-worked by processing with a rolling machine, for example, to the desired thickness, resulting in a roll bonded, multi-layered alloy strip or foil useful for various brazing applications.

Other methods of forming the multi-layered brazing strips or foils could also include starting with a core of titanium or titanium alloy, coating the core (using coating methods known in metallurgy practice) with at least one or more layers of one or more of copper, a copper alloy, nickel, and a nickel alloy. The resulting multi-layered composite could then be coldworked to the desired thickness to a thin strip or foil as described herein.

Specifically, this invention applies the cold, roll bonding process preferably without annealing to produce multi-layer brazing strips or foils consisting of strips of titanium (Ti) with another metal, such as nickel (Ni) and/or copper (Cu), useful, for example, for brazing components that consist of titanium, nickel (Ni) or iron (Fe) based elements or alloys, among other uses. The brazing process results in an alloy of composition according to the weight-percentage of the individual strips. Thin gauge brazing strips and/or foils have proven useful for filling braze joints, or to provide suitable substrate materials to form self-brazing bonds or for vacuum brazing.

The general process starts with commercially pure, or nearly pure, Ti strip, along with one or more Cu and/or Ni strips (or alloys thereof). These strips, with the proper thickness (according to the desired weight-percentage), are then roll bonded together without annealing by the process described hereinbelow to form multi-layer composite strips and/or foils useful in brazing. The layers are typically roll bonded together without annealing, resulting in a different metallurgical bond than would occur with one or more annealing steps. The thickness of each component is selected so that the weight percent of each component matches that of the desired composition of the brazing alloy. The ductile nature of the multi-layer strips also allow additional conventional metal working methods to be utilized, if desired such methods including one or more of additional cold-working, rolling, annealing, cleaning and/or slitting, for example, if desired.

Roll bonding is typically carried out in a bonding mill that provides sufficient pressure to form a metallurgical bond even without annealing between the dissimilar materials. A schematic of an example bonding operation is shown in FIG. 1, with the Ti strip 20 being taken off a roll of Ti 12, a first strip 22 of Cu, Ni, or an alloy thereof being taken from a roll 10, and a second strip 24 of Cu, Ni, or an alloy thereof being taken from a roll 14. The first strip 22 may comprise the same metal as the second strip 24 (both Cu or both Ni, or an alloy thereof), or they may be comprised of different metals (one Cu and one Ni, for example, or each of a different alloy composition of Cu and Ni, for example), depending on the desired configuration of the brazing strip and/or the desired brazing alloy. The strips are typically processed through a rolling mill using rolls 30, resulting in the multi-layered brazing strip or foil 26, which is then taken up on a roll 28.

Figure 2:
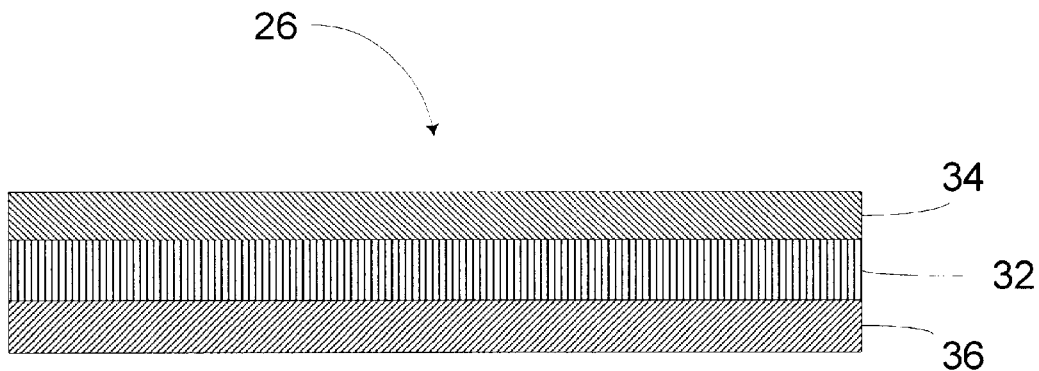
FIG. 2 is a block diagram showing a first example of a brazing strip or foil produced according to the invention.

FIG. 2 shows a close up of an end or side view of an example of the resulting brazing strip or foil 26 output by the bonding operation shown in FIG. 1, with the layer 32 being of Ti, the layer 34 being either Cu, Ni, or an alloy thereof, according to the composition of strip 22, and the layer 36 being either Ni, Cu, or an alloy thereof according to the composition of strip 24.

Figure 3:
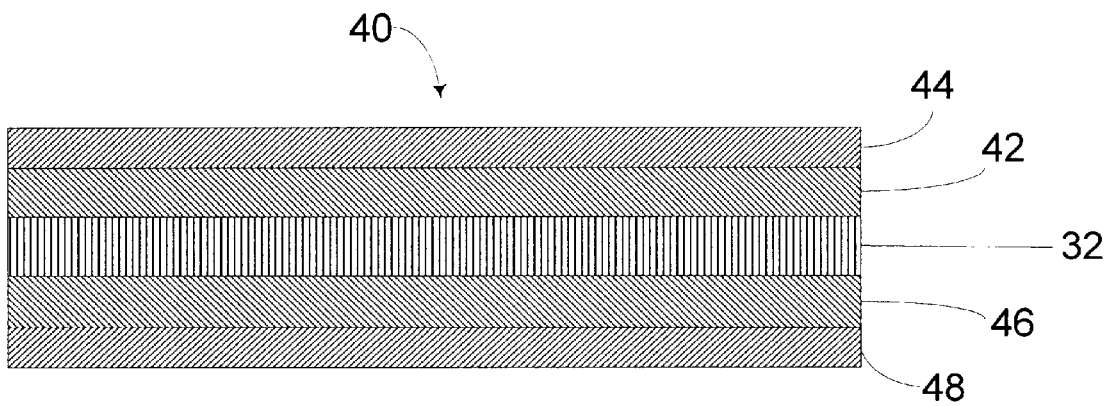
FIG. 3 is a block diagram showing a second example of a brazing strip or foil produced according to the invention.

FIG. 3 shows an additional example of a brazing strip or foil 40 that could be processed according to the invention, of which the strips could be arranged in the manner Cu/Ni/Ti/Ni/Cu, for example, such that layer 44 is Cu, layer 42 is Ni, layer 32 is Ti, layer 46 is Ni, and layer 48 is Cu. However, the placements of the strips can vary in order and/or composition as desired during manufacture, resulting in a number of possible combinations of layers, including but not limited to, Ni/Cu/Ti/Cu/Ni, or various alloys thereof, as an additional example. Multiple strips of Ti could also be utilized, if desired.

Figure 4:
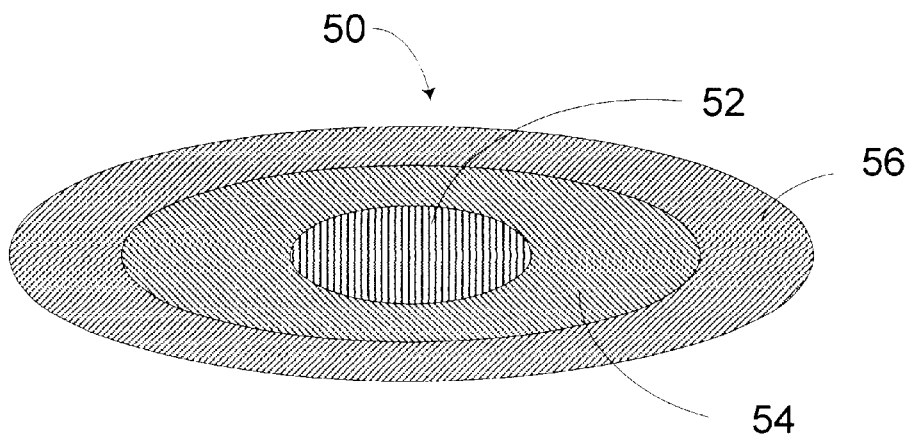
FIG. 4 is a block diagram showing a third example of a brazing strip or foil produced according to the invention.

FIG. 4 shows a still different example of a brazing strip or foil 50 with a titanium core 52 coated with a covering layer 54 completely covering the titanium core, and an additional covering layer 56 completely covering the covering layer. The covering layers will preferably be one or more of copper, a copper alloy, nickel, and a nickel alloy. The titanium core could be a titanium or titanium alloy rod, wire or strip of circular, rectangular, or oval cross section, for example. Alternatively, the covering layer could merely substantially cover the core (not shown), while the additional covering layer could merely substantially cover the covering layer and/or an uncovered portion of the titanium core, such that a majority of the titanium core is ultimately covered, protecting the core from scaling and/or corrosion, and for aiding in the cold-working process.

The bond integrity of the thus obtained metallurgical roll bond (without annealing) allows the cold reduction, such as rolling, to be carried out without any substantial separation between the layers. The cold reduction required can be substantial in order to reach the desired thickness (e.g. 0.001 inch is typical) commonly used for the brazing applications. The process can be used for various thicknesses across a wide range according to the desired uses of the resulting brazing strip. Total reduction, including bonding, can be greater than 90%, with reduction during the bonding greater than 60%, for example. The multi-layer composite can thus be used to replace conventional brazing shims. Furthermore, this multi-layer composite can be roll bonded to the desirable alloy strips (e.g. Ti) to form self-brazing materials which completely eliminate the need for separate brazing shims.

The brazing alloys according to this invention are useful for brazing components comprising or consisting of Ti, Ni or Fe based alloys, among other uses. The lower melting points of these Ti-based brazing alloys can be useful in reducing the effect of heat on the microstructures and mechanical properties of the brazed components. Furthermore, the brazing strips or foils according to the invention provide corrosion resistance that is often superior to the conventional Cu or Ag-based brazing alloys. The roll bonding process allows the brazing alloys, strips and/or foils to be produced in continuous coil form in thin gauge, improving handling characteristics. The availability of these Ti-based brazing alloys in thin foil gauge and in continuous coil length has been difficult to achieve in the past, as the traditional alloys have been extremely brittle and render conventional cold working process difficult.

Although the three components, Cu, Ni and Ti, (or two components, Ni and Ti or Cu and Ti) which make up the constituents of the brazing alloys can be arranged in any sequence, the preferred arrangement is to place one Ti layer in the middle, for most applications, although other arrangements may be useful in specific circumstances (including the addition of additional Ti layers, preferably not on the outside layers). By putting Cu and/or Ni as the outside layers, scale formation can be reduced or eliminated, and easily cleanable surfaces can result, which are often necessary to form quality braze joints.

The Cu, Ni, and/or Ti may be commercially pure elements, or alloys of those elements, depending on the desired properties of the resulting product. By controlling the thicknesses of the resulting various layers, brazing alloy strips of different proportions can be obtained.

The thickness of Ti can be varied between 5 to 95% of the total thickness of the clad materials. The thickness ratios of Ti to the clad materials determine the alloy composition and consequently the melting point of the alloy. It is often beneficial for the Ti thickness ratio to be at about 82% so that the resulting alloy has a composition of 70% Ti, 15% Ni and 15% Cu (in weight percent). However, by adjusting the thickness of raw material prior to bonding, alloy chemistry can be readily adjusted.

A typical example of a useful brazing strip application is a 15Cu-15Ni-70Ti brazing alloy which is commercially used to braze Ti or Ti alloy components. The practice of producing the composite starts out with 0.030" thick CDA 102Cu, and 0.030" thick 201Ni strips. The Cu and Ni strips are rolled bonded and rolled to 0.0045" thick. The Cu/Ni strips are then rolled bonded to both sides of a 0.040" thick commercial pure (CP) Ti, resulting in a five layer composite, such as shown in FIG. 3. The five layer composites of Cu/Ni/Ti/Ni/Cu can be rolled to a 0.002" thickness, for example, which is commonly employed for brazing applications. However, other thicknesses are easily achieved by varying the rolling process, as desired for specific applications.

Note that FIG. 4 shows an alternative to the five layer strip or foil of FIG. 3, literally having only three layers, but with a composition that can be made similar to the five layer strip or foil by using Cu as the outer layer, Ni as the middle layer, and Ti as the core, resulting a Cu/Ni/Ti strip or foil. Additional multi-layer composites can be created by extending these concepts to the desired number of layers.

Another example of a use for the brazing strips is the preparation of 15Cu-15Ni-70Ti brazing alloys. However, in this case, the five layer composite can be arranged in the manner of Ni/Cu/Ti/Cu/Ni. The step used to process the composite is the same as the previous example except the Cu/Ni layers were reversed during the bonding to the Ti layer.

A further example is the brazing alloy of the nominal composition of 33Ni—Ti. The Ni/Ti/Ni composite is typically produced with 0.005" thick 201Ni and 0.040" thick CP grade 2Ti as the starting materials. Two 0.005" thick Ni strips are roll bonded to a 0.0.040" Ti strip. The roll bonded composite is cold rolled to 0.002". Again, other thicknesses are possible by varying the rolling process, and Cu could be substituted for the Ni, if desired.

The Ni/Ti/Ni composite can be roll bonded to suitable alloy strips to form self-brazing materials. Typical example is to roll bond 0.010" thick Ni/Ti/Ni strips to a 0.040" thick 316 stainless steel. The self braze strip is further cold rolled to 0.015" thick which has 20% thickness (0.003" thick) of brazing layers.

The resulting five layer composites, or other variations, can be placed between two sheets of 0.020" thick Beta-21 Ti alloys and placed in a vacuum furnace for brazing. The assembly is then heated to about 950° C. for about 10 minutes and cooled to ambient temperature. The resulting braze joint can be cross-sectioned and metallurgically shown to be sound between the Beta-21 alloys.

The five layer composites can also be cold rolled to 0.005" thick and rolled bonded to the one side of a 0.040" thick, Beta-21 alloy strip. The five layers, brazing alloy side of the thus produced self-brazing Beta-21 material are then placed in a vacuum furnace in contact with another 0.021" thick Beta-21 alloy. The brazing cycle was about 950° C. for about 10 minutes, for example. Braze joints examined for this process were found to be sound.

One of the useful features of this invention is the strongly adherent, multi-layered composites produced by the roll bonding process without annealing. The roll bonding process has some common advantages over the other approaches (such as plating or hot bonding), such advantages, for example, as providing a large reduction (greater than 60%, for example) during the bonding of the components while avoiding the costs and other disadvantages of annealing. The large reduction, by breaking up the surface scale, allows a true metallurgical bond to form between the dissimilar materials without annealing.

Because the temperature of roll bonding process is typically low, there is little concern of possible alloy diffusion or scale formation. The bond integrity typically allows the composite to be processed to the desirable thickness without any intermediate annealing to soften the materials, often reducing manufacturing steps and reducing energy usage, among other benefits. A possible advantage of the roll bonding process according to the invention is to allow the strips to be bonded at heavy thickness, followed by the conventional cold reduction process, and thus often providing a higher throughput than other conventional processes such as plating. Furthermore, the roll bonding process allows for the adjustment of relative thickness of individual constituents in order to tailor the chemical composition of brazing alloys.

There is typically no need to have intermediate annealing steps because the soft to hard layers are built up sequentially, allowing the entire process to be cold worked without annealing steps. Having the soft layer of Cu/Ni on the outside, the rolling is similar to a drawing operation, and the hard Ti can be squeezed thinner to a level that is not achievable when only Ti is being rolled. This has been found to be particularly true for the case of the Cu/Ni/Ti/Ni/Cu layered alloy, and even for the reverse case, because the Ni and Cu ratio is so close, that the small difference in the hardening between the Ni and Cu is of little significance. In contrast, a Cu—NI alloy, especially in the equal weight percent condition, might result in significant hardening due to cold rolling process, and would therefore require intermediate annealing to get to a sufficiently thin gage. The process disclosed herein overcomes that difficulty.

The process can use commercially pure, "elemental" metals and/or alloys as the starting metals (i.e., the "strips" of FIG. 2). The advantage in using an "elemental" alloy such as pure Cu and Ni is that it is easily possible to vary the Cu to Ni ratio in an accurate way, and that commercially, specific alloys of Cu/Ni (such as a 50% Cu/Ni alloy) are often not available, while those that are available are often not acceptable for use in the intended applications. Using commercially pure alloys can provide great flexibility in the final product, as any ratio can be obtained merely by varying the thickness of the starting layers, meaning that the process is not limited by the alloy availability, because pure (or nearly pure) Cu and Ni alloys are typically readily available from many sources.

Having the elemental Ni and/or Cu in contact with the Ti also likely reduces the time for the mixing of either Ti—Cu or Ti—Ni. This can reduce the time to have the mixture of alloys to get to the liquidus temperature to bring further rapid mixing of the brazing composites.

In the arrangement of the components of these multi-layered brazing alloys, it is often preferable to have the Ti somewhere in a middle layer. The advantages of having the Ti layer in the middle are the uniform relative thickness of the Cu/Ni to Ti as well as the homogenous deformation of the composite during the cold reduction. Further, the Ti is protected from scaling and/or corrosion. These advantages are important to provide uniform chemistry and thin finish thickness for brazing shim application.

The choice of the fraying faces on the multi-layer brazing alloys can be either Cu or Ni, or some combination thereof. However, there are several advantages of having the Cu layer as the fraying face, and thus the use of Cu as the fraying face layer is often preferable. This is because the melting point of the Ni—Ti eutectic is at about 942° C. while the Cu—Ti eutectic temperature is at about 855° C. When Cu is in contact with the Ti, the composite typically melts far ahead of the ternary alloy at 950° C. The early onsets of melting would likely cause uneven flow and wetting. Furthermore, in the vacuum brazing operation, the scale of Cu is far less stable than the nickel scale and thus the scale of Cu is less of a concern in preventing the wetting of Ti surfaces.

The invention has been described hereinabove using specific examples of processes and components; however, it will be understood by those skilled in the art that various alternatives may be used and various equivalents may be substituted for elements or steps described herein, without deviating from the scope of the invention. Modifications may be necessary to adapt the invention to a particular situation or to particular needs or a particular use without departing from the scope of the invention. It is intended that the invention not be limited to the particular implementation described herein, but that the claims be given their broadest interpretation to cover all embodiments, literal or equivalent, covered thereby, including all substitutions, known or unknown, of equivalents for the specified steps and/or components of the invention.

What is claimed is:

1. A method of making a brazing strip or foil comprising the steps of:
   providing a first strip consisting essentially of one of copper and nickel, or comprising one of a copper alloy and a, a nickel alloy, wherein said first strip is of uniform composition throughout said strip;
   providing a second strip consisting essentially of one of copper and nickel, or comprising one of a copper alloy, and a nickel alloy, wherein said second strip is of uniform composition throughout said strip;
   providing a titanium strip including titanium; and
   processing said titanium strip between said first and said second strips with a cold rolling machine to reduce a total thickness without any heat treatment step, thereby resulting in a roll bonded, multi-layered brazing strip or foil.

2. The method of claim 1 wherein one of said first and said second strips consists essentially of copper.

3. A method of making a brazing strip or foil comprising the steps of:
   providing a first strip consisting essentially of copper or comprising a copper alloy;
   providing a second strip consisting essentially of nickel or comprising a nickel alloy;
   roll bonding said first strip to said second strip to substantially bond said first strip to said second strip and to reduce a total thickness of said strips to form an outer composite strip;
   providing a titanium strip including titanium; and
   processing said titanium strip with a layer of said outer composite strip on each side of said titanium strip, said processing performed with a rolling machine to substantially bond said layers of said outer composite strip to said titanium strip and to process said resulting brazing strip or foil to reduce a total thickness of said layers and said titanium strip, thereby further resulting in a thin, metallurgically bonded, multi-layered brazing strip or foil.

4. The method of claim 3 wherein said first strip consists essentially of copper.

5. The method of claim 3 wherein said thin, metallurgically bonded, multi-layered brazing strip or foil does not undergo any heat treating step.

6. The method of claim 3 wherein the weight percentage of the resulting thin brazing strip or foil results in a 15wt %Cu-15 wt %NI-70 wt %Ti alloy upon its use in a brazing process.

7. The method of claim 3, said first strip comprising about 0.030" thick copper, and said second strip comprising about 0.030" thick nickel, wherein said outer composite strip is rolled to about 0.0045" thick, and further wherein the outer composite layers are then rolled bonded to both sides of the titanium strip comprising about 0.040" thick resulting in a five layer composite of Cu/Ni/Ti/Ni/Cu which is rolled during said processing into an about 0.002" thick brazing foil.

8. The method of claim 3, wherein a copper or copper alloy surface of one of the layers of said outer composite strip is positioned next to one surface of said titanium strip before said processing.

9. The method of claim 3, wherein a nickel or nickel alloy surface of one of the layers of said outer composite strip is positioned next to one surface of said titanium strip before said processing.

10. The method of claim 3, wherein a copper or copper alloy surface of each of the layers of said outer composite strip is positioned next to each surface of said titanium strip before said processing.

11. The method of claim 3, wherein a nickel or nickel alloy surface of each of the layers of said outer composite strip is positioned next to each surface of said titanium strip before said processing.

12. The method of claim 3, wherein a nickel or nickel alloy surface of one of the layers of said outer composite strip is positioned next to one surface of said titanium strip and wherein a copper or copper alloy surface of the other of the layers of said outer composite strip is positioned next to another surface of said titanium strip before said processing.

13. A method of making a brazing strip or foil comprising the steps of:

provide a first layer consisting essentially of copper or comprising a copper alloy;

providing a second layer consisting essentially of nickel or comprising a nickel alloy;

providing a third layer consisting essentially of copper or comprising a copper alloy;

providing a fourth layer consisting essentially of nickel or comprising a nickel alloy;

processing all layers with a titanium strip including titanium to metallurgically bond said first and second layers together and to one side of said titanium strip and to also metallurgically bond said third and fourth layers together and to another side of said titanium strip; and also processing said resulting brazing strip or foil by roll bonding to reduce a total thickness, further resulting in a thin, metallurgically bonded, multi-layered brazing strip or foil.

14. The method of claim 13, wherein said thin, metallurgically bonded, multi-layered brazing strip or foil does not undergo any heat treating step during said processings.

15. The method of claim 13, wherein one of the layers of copper or a copper alloy is in contact with said one or another side of said titanium strip.

16. The method of claim 13, wherein one of the layers of nickel or a nickel alloy is in contact with said one or another sides of said titanium strip.

17. The method of claim 13, wherein one of the layers of copper or a copper alloy is in contact with said one side of said titanium strip and further wherein one of the layers of nickel or a nickel alloy is in contact with said another side of said titanium strip.

18. The method of claim 13, wherein said first layer is in contact with said one side of said titanium strip, and also wherein said third layer is in contact with said another layer of said titanium strip.

19. The method of claim 13, wherein said second layer is in contact with said one side of said titanium strip, and also wherein said fourth layer is in contact with said another layer of said titanium strip.

20. A method of making a brazing strip or foil comprising the steps of:

providing a first strip consisting essentially of copper or comprising a copper alloy;

providing a second strip consisting essentially of nickel or comprising a nickel alloy;

roll bonding said first strip to said second strip to substantially bond said first strip to said second strip and to reduce a total thickness of said strips to form an outer composite strip without any heat treating step;

providing a titanium strip including titanium; and processing said titanium strip with a layer of said outer composite strip on each side of said titanium strip, said processing performed with a rolling machine to substantially bond said layers of said outer composite strip to said titanium strip and to process said resulting brazing strip or foil to reduce a total thickness of all layers without any heat treating step, thereby further resulting in a thin, metallurgically bonded, multi-layered brazing strip or foil.

21. A method of making a brazing strip or foil comprising the steps of:

providing a first strip consisting essentially of copper or comprising a copper alloy;

providing a second strip consisting essentially of nickel or comprising a nickel alloy;

providing a titanium strip including titanium; and processing said titanium strip between said first and said second strips with a rolling machine to reduce a total thickness without any heat treatment step, thereby resulting in a roll bonded, multi-layered brazing strip or foil.

22. A method of making a brazing strip or foil comprising the steps of:

providing a first strip consisting essentially of copper or nickel, wherein said first strip is of uniform composition throughout said strip;

providing a second strip consisting essentially of copper or nickel, wherein said second strip is of uniform composition throughout said strip;

providing a titanium strip including titanium; and processing said titanium strip between said first and said second strips with a cold rolling machine to reduce a total thickness without any heat treatment step, thereby resulting in a roll bonded, multi-layered brazing strip or foil.

* * * * *